United States Patent [19]

Hull et al.

[11] Patent Number: 5,362,184

[45] Date of Patent: Nov. 8, 1994

[54] LOCK DEVICE FOR GARBAGE TRUCK CONTAINER

[76] Inventors: Harold L. Hull, 401 Canyon Way #43, Sparks, Nev. 89434; Blaine E. Pugh, 3300 Smith Dr., Reno, Nev. 89509

[21] Appl. No.: 76,775

[22] Filed: Jun. 15, 1993

[51] Int. Cl.$^5$ .......................... B60P 7/13; B60P 7/08; B62D 24/00; E05C 5/00
[52] U.S. Cl. ............................ 410/90; 410/77; 403/325; 403/327; 248/503; 296/35.1; 292/60
[58] Field of Search ......................... 410/77, 78, 80, 81, 410/84, 85, 90, 91; 403/321, 326, 324, 325, 327; 224/42.4; 294/81.53; 206/35.1, 35.3; 248/500, 503, 551, 224.4, 223.4; 24/287; 292/57, 58, 60, 61

[56] References Cited

U.S. PATENT DOCUMENTS

| | | | |
|---|---|---|---|
| 3,717,373 | 2/1973 | Carr | 410/77 |
| 3,872,555 | 3/1975 | Link | 24/221 R |
| 4,125,077 | 11/1978 | Baaso | 105/366 B |
| 4,139,228 | 2/1979 | Varadi | 294/83 R |
| 4,165,859 | 8/1979 | Duly | 403/324 X |
| 4,266,820 | 5/1981 | Whaley et al. | 296/35.3 |
| 4,290,726 | 9/1981 | Sutela | 414/421 |
| 4,315,651 | 2/1982 | Endicott | 294/83 R |
| 4,453,878 | 6/1984 | Paukku | 414/491 |
| 4,459,072 | 7/1984 | Schulz | 410/82 |
| 4,787,789 | 11/1988 | Stagars et al. | 410/80 |
| 5,032,045 | 7/1991 | Calco | 410/80 |
| 5,062,669 | 11/1991 | McManigal et al. | 292/60 |
| 5,205,602 | 4/1993 | Hoare et al. | 248/503 X |

FOREIGN PATENT DOCUMENTS 994347 2/1983 U.S.S.R. ................ 294/81.53

Primary Examiner—Michael S. Huppert
Assistant Examiner—Stephen Gordon

[57] ABSTRACT

A locking device is disclosed which is adapted to be welded to at least two support rails of the bed of a truck such as a garbage truck and which engages the I-beams of the container such as a garbage container to eliminate the necessity of chaining the container to the garbage truck, thus saving time and providing safety from snapping a chain.

4 Claims, 3 Drawing Sheets

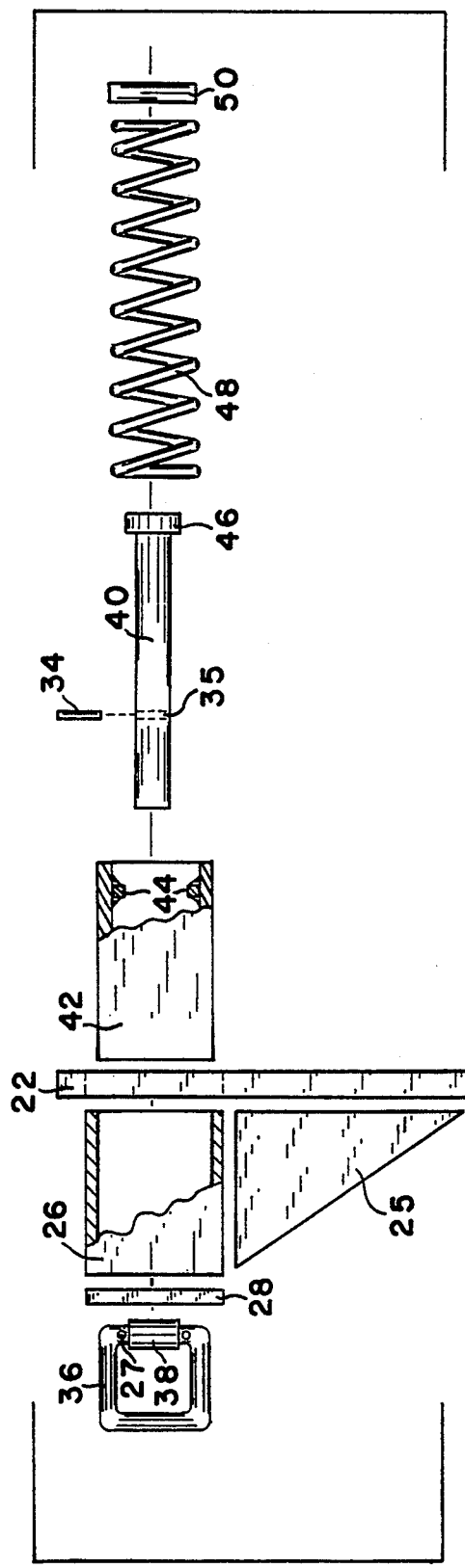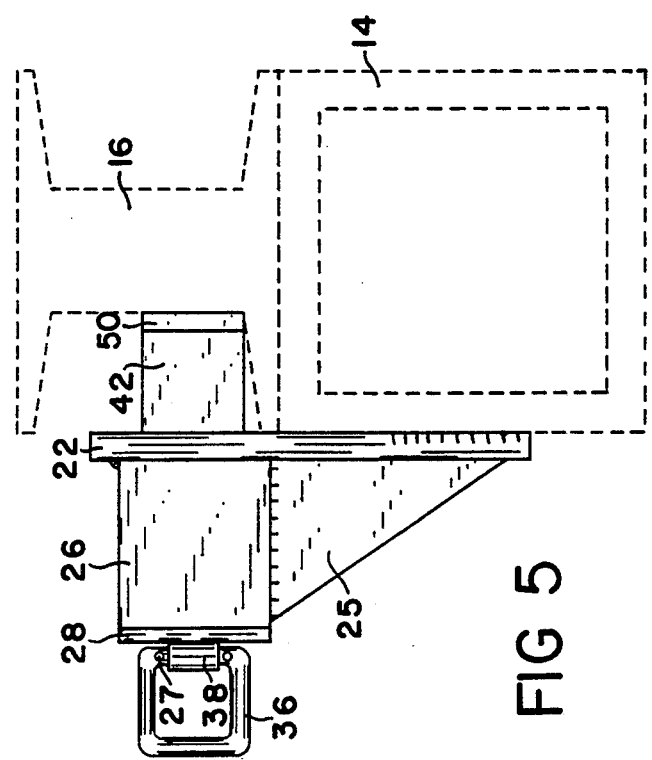
FIG 4
FIG 5

LOCK DEVICE FOR GARBAGE TRUCK CONTAINER

FIELD OF THE INVENTION

This invention relates to locking or holding devices for use between a truck bed and a removable container and more specifically between the rails of a garbage truck and the I-beams of a garbage container.

BACKGROUND OF THE INVENTION

In the past a number of devices have been proposed to lock a freight container to the bed of a truck such as U.S. Pat. No. 4,290,726, which teaches a loading and un-loading device, and other coupling devices for freight containers such as U.S. Pat. No. 3,872,555 which must be adapted to the container with special elongated mating holes being fabricated into the containers or the coupling for quick attachment to a plate-like structure or U.S. Pat. No. 4,315,651, which again, requires a mating hole to receive a locking twist bolt. While these devices are complete in themselves for their intended purpose, they are not satisfactory for the purpose of which the present invention addresses as will be disclosed in the following drawings and specifications.

SUMMARY OF THE INVENTION

The preferred embodiment of the present invention addresses the problem of holding or locking a garbage container as used by disposal companies to the bed of a garbage disposal truck. This invention is not concerned with the locking of the container to the truck bed in its forward and backward motion but is concerned with holding down the container to the rails of the bed of the truck. In a conventional prior art container the container is mounted to two elongated I-beams running the length of the container which in its loaded position sets on the rails of the truck. In prior art practice the container is "chained" to the rails by the workman which involves time and in a heavy load situation with the tank being top heavy can snap a chain when side thrust is generated by turning a corner.

The present invention provides a substantially square spring loaded tubular locking device which is bolted or welded to the frame or rails on each side of the truck bed and when in its locked position, allows a portion of the square tubular locking device to protrude over the bottom lip of the I-beam of the container thus holding the container securely to the rails of the truck. In its un-locked position the protruding section of the device is pulled back into a larger tubular section and locked by a quarter turn of an actuator pin and handle thus allowing the workman to load and unload the container without interfering with the protruding tubular section.

It is therefore a primary object to provide an add-on device to the side rails of a garbage disposal truck to facilitate holding down a garbage disposal container.

It is a further object to provide means to hold down the garbage disposal container to the bed of a garbage disposal truck without modification of the garbage disposal container.

Still another important object is to provide a two-position spring loaded add-on hold-down which may be quickly and efficiently operated by a workman.

Yet another object is to eliminate the necessity of using hold-down chains.

Other objects and advantages will become apparent when taken into consideration with the following drawings and specifications.

BRIEF DESCRIPTION OF THE DRAWINGS

FIG. 4, is an exploded plan view including partial cut-a-way sections.

FIG. 5, is a side view drawn to a different scale of the preferred embodiment affixed to an I-beam of a garbage container (shown in ghost lines).

DETAILED DESCRIPTION OF THE DRAWINGS

Figure 1:
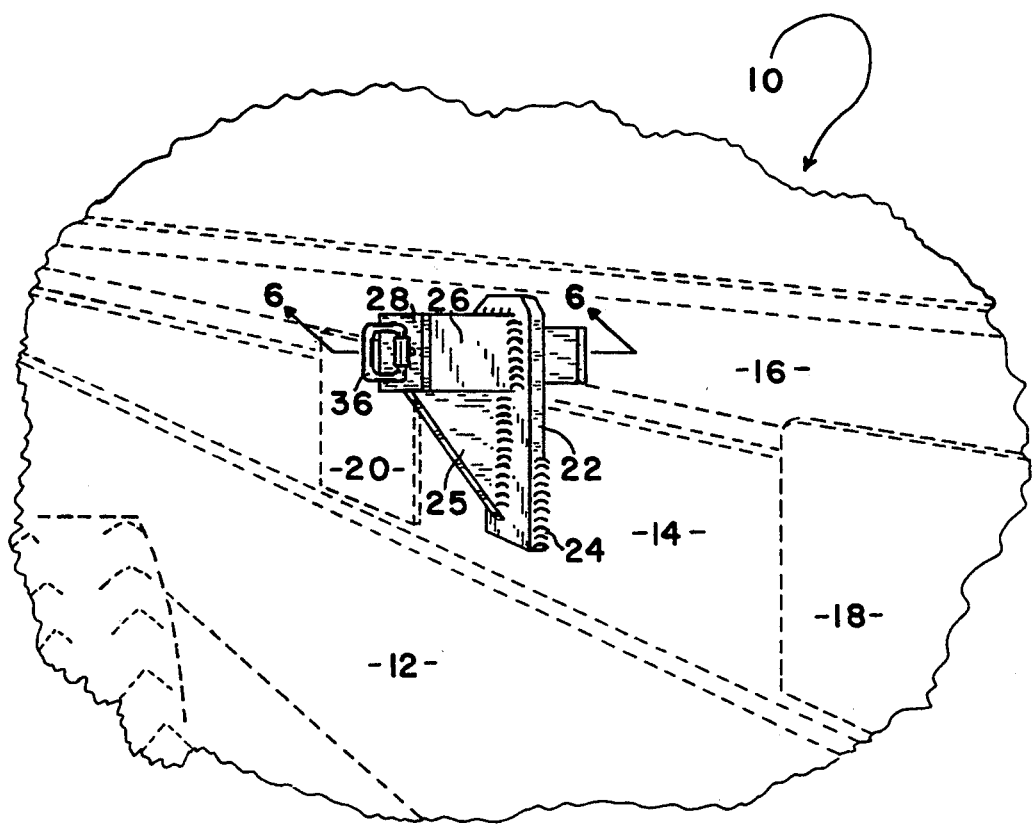
FIG. 1, is a perspective view of the preferred embodiment affixed to a prior art disposal truck rail (shown in ghost lines) and in a locking position.
Figure 2:
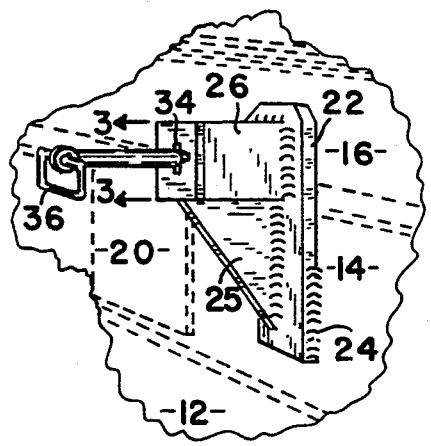
FIG. 2, is a similar perspective view of the preferred embodiment affixed to a prior art disposal truck rail (shown in ghost lines) and in an un-locked position.
Figure 3:
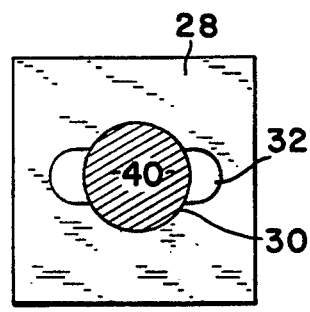
FIG. 3, is a sectional view taken at 3—3 of FIG. 2.
Figure 6:
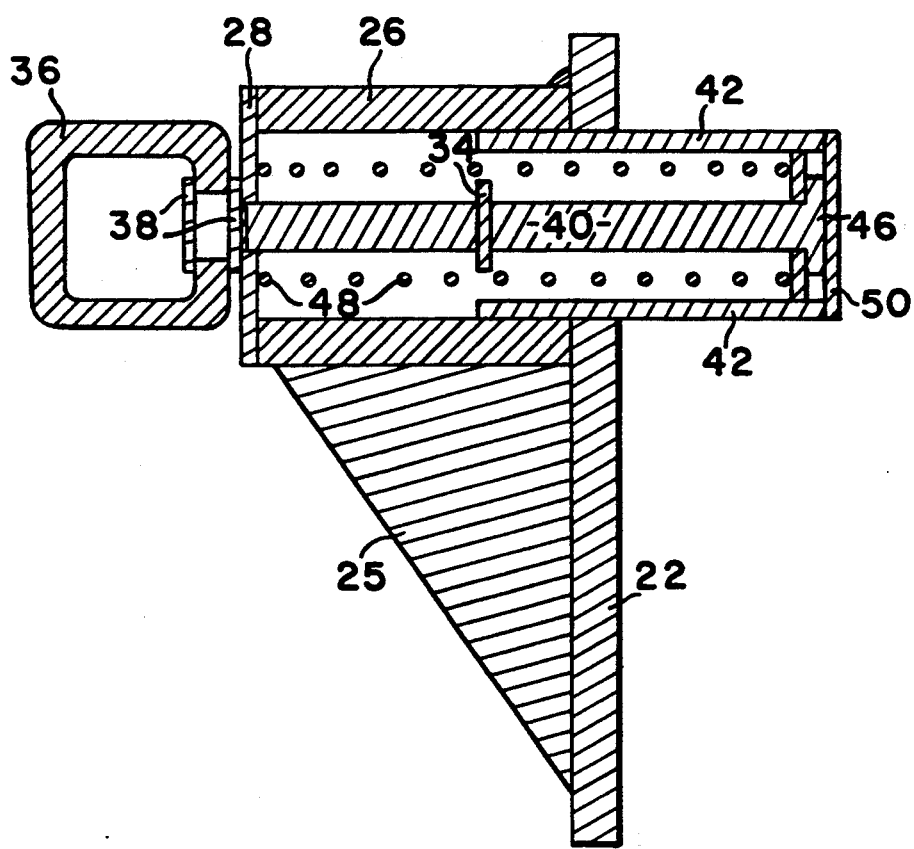
FIG. 6, is a sectional view taken at 6—6 of FIG. 5.

Referring now in detail to the drawings wherein like characters refer to like elements throughout the various drawings, 10 is an overview of the preferred embodiment of the present invention with 12 being a truck frame, 14 a top frame rail, 16 being an I-beam supporting a garbage container (not shown) with 18 & 20, respectively, being guide plates, with 12, 14, 16, 18 and 20 respectively, being prior art and shown in ghost lines in FIGS. 1 and 2. 22 is a support plate of the present invention which is suitably affixed to rail 14 such as by welding 24. 25 is a gusset, with 26 being a first square tubular member having its outer exposed end covered with a plate 28 and having a bore 30 substantially in its center section as further shown in FIG. 3. 32 is a slot of a size and shape to accept pin 34, pin 34 more clearly shown in the exploded plan view of FIG. 4. 36 is a handle having retaining means such as a welded nub 27 as shown in FIGS. 4 & 5. 38 being a round tubular T-member affixed such as by welding to rod 40 and acting as a hinge for handle 36, while 42 is a second square tubular member having a telescopic relationship with first tubular member 26 and having in its interior an abutment 44 (such as a washer) welded or fabricated in place near its outer end which acts as a stop to capture the head 46 of rod 40 with 48 being a spring and 50 being an end cap.

The preferred embodiment as shown is fabricated from metal and is assembled at the point of manufacture by welding into place the abutment or washer 44 into the second tubular member 42. The rod 40 is then inserted through the washer 44 and end cap 50 welded in place. The spring 48 is assembled over the rod 40 and pin 34 (pin 34 having been inserted into rod 40 through bore 35 and being a friction fit) and the second tubular telescopic member 42 inserted into the first tubular member with the rod 40 being inserted into bore 30 of the end plate 28 (end plate 28 having previously been welded into place) by compressing spring 48 sufficiently to allow the exposed end of rod 40 to protrude a sufficient distance to weld the round tubular T-member 38 to it. The handle 36 may now be affixed into the T-member 38 and the entire assembly inserted through a square hole in support member 22 and welded into place along with gusset 25.

It will now be seen that the locking device has a first and second position with the first position being shown in FIG. 2, with the rod 40 pulled out to its extreme position and turned a quarter turn to allow pin 34 to hold the assembly in its first position and when the rod 40 is again turned a quarter turn the pin 34 slips through the slot 32 and the spring 48 forces the device into its second position, that is, with the second square tubular member extending over the lip of I-beam 16 as shown in FIGS. 1 and 5. It is to be understood that in the preferred embodiment that the locking device is affixed to the rails of the truck bed by means such as welding with at least one on either side of the truck bed.

It will now be seen that we have provided a simple locking hold-down device for a garbage truck container which is easily fabricated from metal and welded in place on either side of a prior art garbage truck and which eliminates the workman having to use chains to chain down the garbage container to the truck bed.

It will also be noted that no modification of the garbage truck or garbage container is necessary other than affixing such as by welding the device to the garbage truck.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described our invention, what we claim as new and desire to secure by letter patent is:

1. A locking device cooperating with a prior art container and a prior art truck bed, said container having at least two bottom support I-beams, said truck bed having at least two bed support rails, said rails being in proximity with said two I-beams, said locking device comprising; a first substantially square elongated tubular member having a first end closed and a second end open, said first end having a bore substantially located in its center, said first end having at least one slot opening into said bore, a second substantially square elongated tubular member having a first and second end, said second member being telescopically located within said first member, said first end of said second member being open, said second end of said second member being closed, a rod, said rod having a diameter smaller than said bore of said first end of said first square tubular member, said rod extending through said bore, said rod having a head on one of its ends, a round tubular member, said round tubular member being affixed to an end of said rod distal from said rod end having said head said second end of said second member having means to capture said head of said rod in a rotating relationship, said head being rotatably captured within said second member by said capture means, a compression spring, said spring being engaged between said first end of said first member and said capture means such that said second member is biased away from said first end of said first member, a pin, said rod having a transverse bore substantially in its center section, said rod bore accepting said pin in a friction fit, said pin being of a length longer than said diameter of said rod, a handle, said handle being affixed to said round tubular member, a substantially rectangular mounting plate having a top half and a bottom half, said mounting plate having a substantially square hole in said top half, said hole accepting said second tubular member in a working sliding relationship, means to affix said first square tubular member to said mounting plate wherein said first member surrounds said square hole in said mounting plate, a support gusset, said gusset being affixed to said first square tubular member and said bottom half of said mounting plate to hold said first square tubular member and said mounting plate at substantially a 90 degree angle relative to each other, means to mount said bottom half of said mounting plate to said bed support rails of said truck bed, said locking device having a first and second position, said first position being in an extended position, said second position being in a closed position, whereby;

when said locking device is in its said first extended position, said compression spring holds said locking device in a tensioned position with said second tubular member being capable of extending over a lip of said I-beam of said container and when said locking device is in its said second position, said second tubular member is held within said first square tubular member by said pin engaging said closed end of said first square tubular member when said rod is turned a quarter turn by said handle.

2. The locking device of claim 1 in which said means to capture said head of said rod in a rotating relationship is a partition within said second tubular member, said partition having a bore to accept said rod whereby;

said head of said rod is captured between said partition and said closed second end of said second member.

3. The locking device of claim 1 in which said device is fabricated from metal and wherein at least two device components are attached by welding.

4. The locking device of claim 1 in which said means to mount said bottom half of said mounting plate to said truck bed support rails comprises a weld.

* * * * *